United States Patent [19]
Brassert et al.

[11] Patent Number: 5,836,713
[45] Date of Patent: Nov. 17, 1998

[54] COUPLING MECHANISM FOR ESTABLISHING AN INVOLUTE SPLINE CONNECTION

[75] Inventors: Walter L. Brassert, Belmont; Paul N. Dahlstrand, Andover, both of Mass.

[73] Assignee: Ingersoll-Rand Company, Woodcliff Lake, N.J.

[21] Appl. No.: 848,931

[22] Filed: May 1, 1997

[51] Int. Cl.$^6$ .................................................. F16B 3/00
[52] U.S. Cl. .................... 403/359; 403/315; 403/319; 464/160; 464/182
[58] Field of Search .................... 403/359, 319, 403/315, 348; 464/901, 160, 182

[56] References Cited

U.S. PATENT DOCUMENTS

| | | |
|---|---|---|
| 2,896,465 | 7/1959 | Armitage et al. . |
| 2,905,008 | 9/1959 | Sears . |
| 2,936,625 | 5/1960 | Heiseler . |
| 3,090,641 | 5/1963 | Eminger . |
| 3,399,549 | 9/1968 | Nagele . |
| 3,608,936 | 9/1971 | Karden ................................ 403/348 X |
| 4,473,317 | 9/1984 | Bolang . |
| 4,606,671 | 8/1986 | Rasmussen . |
| 4,701,068 | 10/1987 | Andrews et al. . |
| 4,919,562 | 4/1990 | Anthony et al. . |
| 5,156,483 | 10/1992 | Mangas . |

Primary Examiner—Anthony Knight
Assistant Examiner—David Bochna
Attorney, Agent, or Firm—Michael M. Gnibus

[57] ABSTRACT

An involute spline connection including a male spline having an end, an axis, and a first involute defining peaks and valleys; a follower member; a female involute having a second involute defining second peaks and valleys and a locking member having a locking member involute defining locking member peaks and valleys, and a cam groove along the exterior of the locking member; the follower adapted to engage the cam groove so that when the hub is moved axially the locking member to be repositioned to a locked position so that each of the locking member peaks is adjacent a first valley, and an unlocked position where the first and locking peaks are aligned.

7 Claims, 3 Drawing Sheets

# COUPLING MECHANISM FOR ESTABLISHING AN INVOLUTE SPLINE CONNECTION

BACKGROUND OF THE INVENTION

The invention relates to a mechanism for establishing an involute spline connection and more particularly, to a mechanism for establishing a connection between a male involute spline adapter and a female involute spline wherein axial displacement of the male involute spline adapter is prevented by a locking member moved into a locking position as a follower engages a locking member cam groove.

It is often necessary to couple a male spline adapter with a female spline provided in the end of a shaft or other movable element of an apparatus, such as an engine. The female spline is typically adapted to be rotated during operation of the associated apparatus.

In order for the rotation of the female spline to be effectively imparted to the male spline adapter, axial displacement of the male spline adapter must be prevented. To prevent such axial displacement, and establish the required coupling, the male adapter is typically anchored by a conventional fastener such as a bolt. The fastener is passed through a bore that extends axially through the male adapter and is threadably anchored to the shaft or other apparatus element, behind the female spline.

Although this means for establishing the required coupling effectively anchors the male spline adapter, it may be difficult or impossible to anchor the bolt to the shaft and establish the required coupling. For example, the shaft may be hollow behind the female spline, or there may be another feature of the shaft that would prevent the addition of a threaded hole.

Axial displacement of the male spline adapter may be prevented by discrete parts adjacent the male spline adapter. The adjacent parts effectively impede axial displacement of the male spline adapter. Such a mechanism for impeding axial displacement of the male spline adapter is comprised of a relatively large number of discrete parts and as a result, is quite costly to manufacture and difficult to assemble.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a mechanism for establishing an involute spline connection, the mechanism including a hub having an axis, a first end with a cavity formed at the first end, a second hub end, an outer periphery with a first involute spline defining alternating first peaks and first valleys spaced around the outer periphery, and a follower recess; a locking member adapted to be located substantially in the cavity, the locking member comprising: a lip formed at the first locking member end, said lip having an outer periphery with a second involute spline defining alternating second peaks and second valleys spaced around the lip outer periphery, the locking member also including a cam groove along the exterior of said locking member; and a follower member located in the follower recess. A follower is adapted to be located in said follower recess, the follower is adapted to engage said cam groove to cause the locking member to be moved to a locked position wherein each of the second peaks is adjacent a first valley when the hub is moved in a first axial direction, and to cause the locking member to be moved to an unlocked position wherein first and second peaks are aligned when the hub is moved in a second axial direction.

The foregoing and other aspects will become apparent from the following detailed description of the invention when considered in conjunction with the accompanying drawing figures.

DESCRIPTION OF THE DRAWING FIGURES

DESCRIPTION OF THE PREFERRED EMBODIMENT

Figure 1:
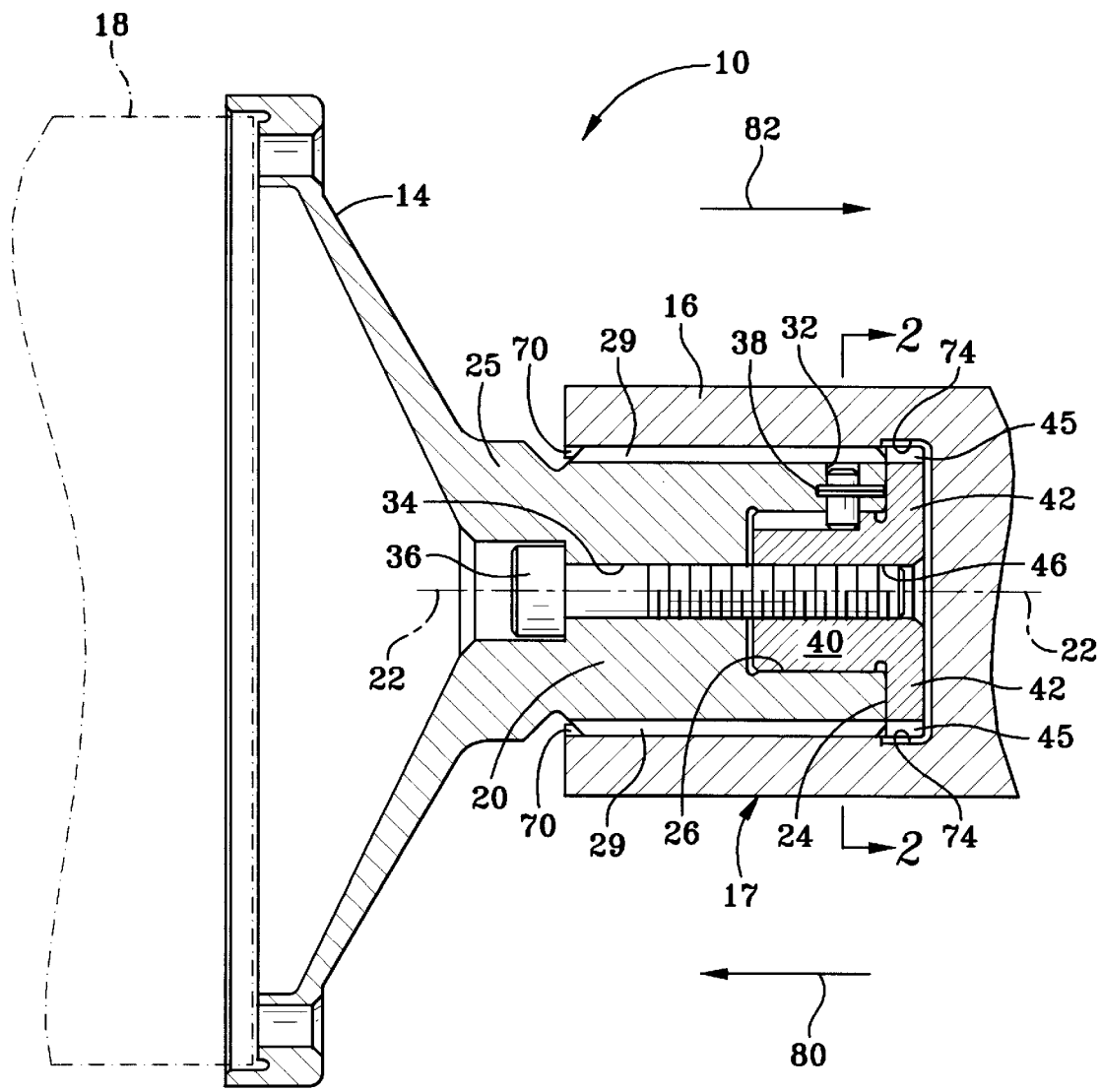
FIG. 1 is a longitudinal sectional view of the involute coupling mechanism of the present invention generally showing the interrelation of the male coupling member, locking member, and female coupling member.

Turning now to the drawings wherein like parts are referred to by the same number throughout the several views, FIG. 1 shows an involute spline coupling identified generally at 10. The coupling 10 includes a locking member 40 for establishing the required connection between male spline coupling member 14 and female coupling member 16, and for preventing axial displacement of the male coupling member 14.

Figure 2:
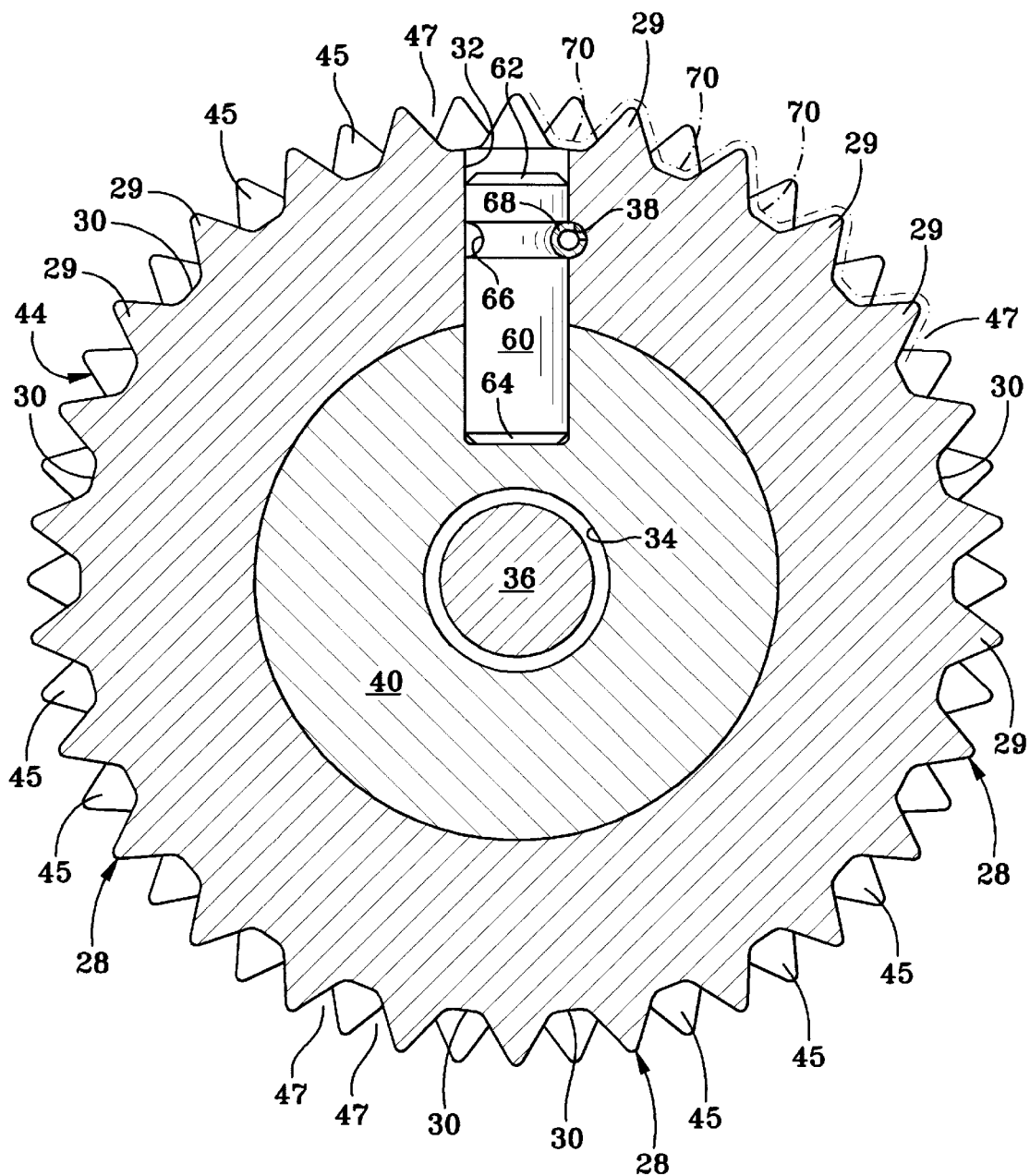
FIG. 2 is a sectional view taken along line 2—2 of FIG. 1.

Male coupling member 14 is adapted to be connected to a shaft 18 or the like, for movement with the shaft. The male coupling member includes a cylindrical hub 20 having an axis 22, a first hub end 24 with a cavity 26 formed in the first hub end, a second hub end 25, and a first involute spline 28 extending around the outer periphery of the hub as shown in FIG. 2. The first involute spline 28 defines alternating peaks 29 and valleys 30 that separate adjacent peaks 29. The peaks 29 and valleys 30 extend longitudinally along substantially the length of the hub.

Hole 34 extends longitudinally along axis 22 between the second hub end 25 and cavity 26, and is adapted to receive a conventional fastener 36 which may be a bolt for example.

A radially extending follower recess 32 extends through a portion of first involute spline 28 between the outer periphery of the hub 20 and the hub cavity 26. As shown in FIG. 2, a semicircular pin groove 38 is provided along the cylindrical wall of the follower recess. The pin groove is oriented longitudinally as shown in FIG. 1.

Locking member 40 is adapted to be located substantially in cavity 26 as shown in FIG. 1. The locking member has a cylindrical hub 41 with a locking member axis 22b, first and second hub ends 43 and 49 respectively, and a lip 42 at the second hub end. Axis 22b is aligned with axis 22 when the locking member hub 41 is substantially located in the cavity 26.

The hub lip 42 has an outer periphery and a second involute spline 44 along the outer periphery of the lip. The second involute spline 44 is like spline 28, and defines alternating peaks 45 and valleys 47 separating adjacent peaks 45. As shown in FIG. 2, the peaks and valleys 45 and 47 are spaced around the lip along the lip outer periphery. The peaks and valleys extend across the lip width as shown in FIG. 3.

Chamfered edge 54 at first hub end 43, helps to more efficiently locate hub 40 in cavity 26 during assembly of coupling 10.

Hole 46 extends longitudinally through the locking member along axis 22b. Hole 46 is adapted to threadably receive conventional fastener 36 so that when the locking member 40 is substantially located in cavity 26, the fastener 36 joins the member 40 and hub 20.

Figure 3:
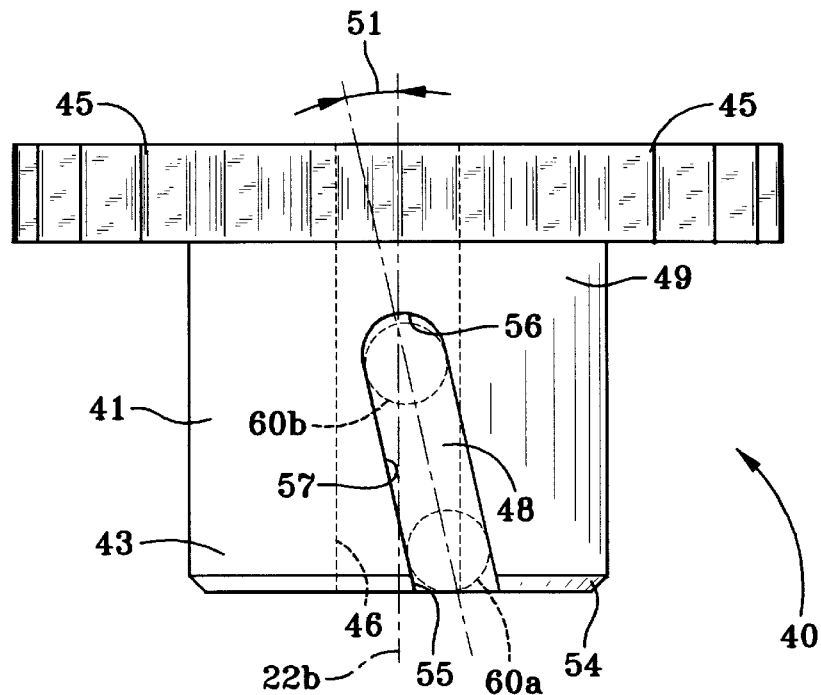
FIG. 3 is a top plan view of the locking member showing the locking member cam groove.
Figure 4:
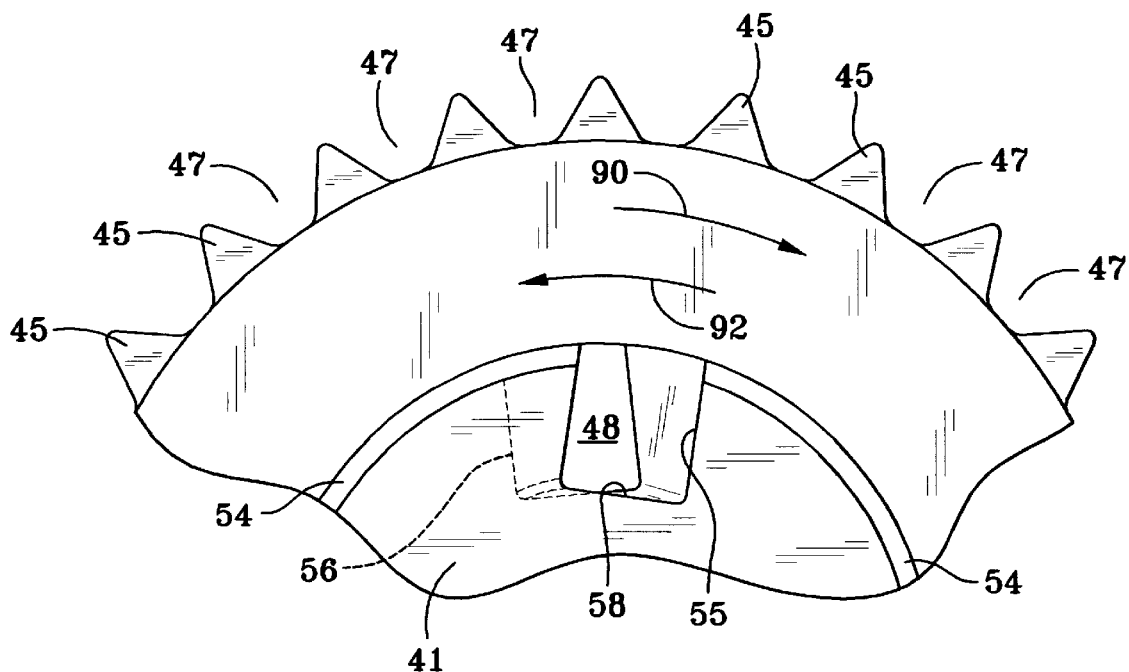
FIG. 4 is a partial side elevational view of the locking member of FIG. 3.

Cam groove 48 is formed along the exterior of the locking member hub 41 as shown in FIGS. 1, 3, and 4. The cam groove has an open mouth 55 at hub end 43, and extends linearly toward hub end 49 at an acute angle relative to axis 22b, and terminates at semicircular closed end 56. The acute angle is generally identified at 51 in FIG. 3. Sidewalls 57 and bottom wall 58 join the end 56 and mouth 55. In this way, the cam groove 48 is defined by the sidewalls, bottom wall and closed end 56.

Follower 60 is adapted to be located in radially extending follower recess 32 so that a portion of the follower is located in cam groove 48. See FIG. 2. The follower is a unitary cylindrical member with chamfered ends 62 and 64 to accommodate insertion of the follower into the groove 48 and recess 32, and has an annular locking pin groove 66 with an arcuate cross-section. The pin groove 66 is aligned with groove 38 when the follower is located in the recess and roll pin 68 is inserted in the circular opening defined by the arcuate grooves 38 and 66 and in this way, maintains the follower stationary in the required position in follower recess 32.

Conventional, female involute spline 16 formed at the end of shaft 17, defines a plurality of peaks and valleys which are adapted to slidably engage peaks and valleys 29 and 30 of spline 28. The peaks and valleys are spaced circumferentially around the interior of the shaft 17. The male and female involute splines are designed be slidably coupled together in a manner well known to one skilled in the art. A representative portion of the peaks and valleys of the female spline are shown in dashed font in FIG. 2, and the peaks are identified by reference number 70. Recess 74 located adjacent the inward end of the female involute is adapted to enclose the second involute 44 of the locking member 40 when the involutes 28 and 44 are coupled.

Coupling and uncoupling of the coupling 10 will know be described.

Follower 60 is inserted in follower recess 32 with a portion of the follower located in cavity 26 and recesses 66 and 38 aligned. Then, the roll pin 68 is inserted in the opening defined by the aligned recesses.

Locking member 40 is then slid into cavity 26. Initially the locking member is located adjacent the cam groove mouth 55. Then the locking member is slid axially along axis 22 toward hub second end 25 so that follower 60 is located in cam groove 48 and is in engagement with the cam groove sidewalls and bottom wall. This initial follower position is identified by dashed font follower 60a in FIG. 3.

As the locking member is inserted along axis 22 into cavity 26, the follower and cam groove are in engagement and by this engagement, the hub is caused to rotate a small distance, clockwise about axis 22, as indicated by arrow 90 in FIG. 4, and as a result, the peaks and valleys of involutes 28 and 44 are substantially circumferentially aligned.

Bolt 36 is passed through hole 34 and is threaded into a portion of hole 46 but is not completely tightened. Then with locking member 40 and hub 20 loosely joined in this manner with the peaks of first and second involutes 28 and 44 aligned circumferentially, the female coupling member 16 is slid into engagement with the aligned involutes until the second involute 44 is located in recess 74 as shown in FIG. 1.

Then, fastener 36 is tightened, and as the fastener is tightened, male coupling member 14 is drawn linearly along axis 22, in a first direction identified by arrow 82. As the coupling member 14 is drawn inwardly, the follower, which is in engagement with the cam groove, causes the locking member 40 to be further displaced in the clockwise direction 90 about axis 22. When the fastener 36 is tightened, follower 60 is located at closed end 56 as represented by follower 60b in FIG. 3.

The camming action produced as the male coupling member is drawn linearly by the fastener, causes the locking member 40 to rotate about axis 22, and thereby repositions the locking member 40 to a locking position with involutes 44 adjacent the valleys 30 separating adjacent first involutes 28 and the peaks 70 of the female involute 16. When tightened, the lip 42 is in abutment with the first end of the hub. In this way, axial displacement of the male coupling member is effectively prevented and the required connection between the involutes is established.

To uncouple the male and female coupling members 14 and 16, the fastener 36 is untightened, and as the fastener is untightened, the coupling member 14 is displaced axially in the direction of arrow 80. Follower 60 is in engagement with cam groove 48 and this engagement rotates the locking member counterclockwise about axis 22 a small distance. The counterclockwise rotation is identified by arrow 92 in FIG. 4.

When the fastener is untightened, and first and second involutes 28 and 44 are circumferentially aligned, the female coupling member disconnected from the male coupling member. The fastener is then completely untightened and the locking member is removed from the cavity 26.

By the locking member 40, the required connection between the male and female coupling members is established and axial displacement by the male coupling member is prevented.

While we have illustrated and described a preferred embodiment of our invention, it is understood that this is capable of modification, and we therefore do not wish to be limited to the precise details set forth, but desire to avail ourselves of such changes and alterations as fall within the purview of the following claims.

Having described the invention, what is claimed is:

1. A mechanism for establishing an involute spline connection, said mechanism comprising:

A) a hub, said hub comprising an axis, a first hub end with a cavity formed at the first hub end, a second hub end, an outer periphery with a first involute spline defining alternating first peaks and first valleys spaced around the outer periphery of the hub, said hub also including a follower recess joining said outer periphery and said cavity;

B) a locking member adapted to be located substantially in said cavity, said locking member comprising: a first locking member end, a second locking member end, a lip at the locking member first end, said lip having an outer periphery with a second involute spline defining alternating second peaks and second valleys spaced around the outer periphery of said lip, said second involute spline adjacent said first involute spline when the locking member is located substantially in said cavity, said locking member also including a cam groove along the exterior of said locking member;

C) coupling means for coupling the locking member and hub, said hub movable axially when the locking member and hub are coupled and uncoupled by the coupling means; and D) a follower adapted to be located in said follower recess, said follower adapted to engage said cam groove to cause the locking member to be moved to a locked position wherein each of the second peaks is adjacent a first valley when the hub is moved in a first axial direction, and to cause the locking member to be moved to an unlocked position wherein first and second peaks are aligned when the hub is moved in a second axial direction.

2. The mechanism as claimed in claim 1 wherein the cam groove has a mouth formed at the first locking member end, and a second cam groove end adjacent the second locking member end, wherein the second cam groove end is closed.

3. The mechanism as claimed in claim 2 wherein the cam groove is defined by a first sidewall, a second sidewall, a bottom wall and the second cam groove end, said sidewalls and bottom wall joining the mouth and second cam groove end.

4. The mechanism as claimed in claim 2 wherein the locking member has an axis and wherein the cam groove extends linearly between the mouth and the second cam groove end at an acute angle relative to the locking member axis.

5. The mechanism as claimed in claim 1 wherein the follower recess extends radially, and includes a first locking groove and said follower is a cylindrical member.

6. The mechanism as claimed in claim 5, the follower including a second locking groove, adapted to be aligned with the first locking groove when the follower is located in the follower recess, said follower held in place in the follower recess by a roll pin seated in the space defined by the aligned locking grooves.

7. The mechanism as claimed in claim 1 wherein said locking member is held in said hub cavity by a fastener.

* * * * *